United States Patent [19]

Suzuki et al.

[11] 4,076,606

[45] Feb. 28, 1978

[54] METHOD OF DECOMPOSING NITROGEN OXIDE ($NO_x$)

[75] Inventors: Shin Suzuki, Chiba; Kazuo Matsumoto, Ohizumi; Ichiro Nakaoka, Machida, all of Japan

[73] Assignee: Kabushiki Kaisha Pollution Preventing Research Laboratory, Tokyo, Japan

[21] Appl. No.: 710,471

[22] Filed: Aug. 2, 1976

Related U.S. Application Data

[63] Continuation-in-part of Ser. No. 653,258, Jan. 20, 1976, abandoned.

[51] Int. Cl.$^2$ ............................................. B01J 1/10
[52] U.S. Cl. ..................... 204/157.1 R; 204/DIG. 11
[58] Field of Search ................ 204/157.1 R, DIG. 11, 204/157.1 H; 60/275; 250/527; 423/212

[56] References Cited

U.S. PATENT DOCUMENTS 3,862,043   1/1975   Haakenson ........................ 250/527

*Primary Examiner*—Howard S. Williams
*Attorney, Agent, or Firm*—Fitzpatrick, Cella, Harper & Scinto

[57] ABSTRACT

A method of decomposing $NO_x$ which includes exciting effluent gas containing nitrogen and $NO_x$, or nitrogen, $NO_x$ and oxygen and/or carbon dioxide, and so on, with microwave irradiation.

12 Claims, No Drawings

METHOD OF DECOMPOSING NITROGEN OXIDE ($NO_x$)

CROSS-REFERENCE TO RELATED APPLICATION

This application is a continuation-in-part of copending application Ser. No. 653,258, filed Jan. 20, 1976, now abandoned.

BACKGROUND OF THE INVENTION

1. Field of the Invention

The present invention relates to a method of removing $NO_x$ from effluent gases containing $N_2$ and $NO_x$, or $N_2$, $NO_x$ and sulfur dioxide ($SO_2$), or $N_2$, $NO_x$ and $O_2$ and/or $CO_2$, and so forth.

2. Description of the Prior Art

Effluent gases from various boilers and heating furnaces contain $N_2$, oxygen ($O_2$), $NO_x$, $SO_2$ and so on, while exhaust gases from vehicles, such as automobiles generally contain $N_2$, $NO_x$, carbon monoxide (CO) and hydrocarbons (H.C.), wherein the $NO_x$ is present in concentrations which are usually higher than in effluent gases from heating furnaces and so on.

Each poisonous substance, i.e. $NO_x$, $SO_2$ and H.C. is a source of pollutant in the atmosphere, respectively.

Several methods of removing $NO_x$ have been well known, such as catalytic decomposition, catalytic reduction, oxidation-absorption or adsorption processes, etc. Particularly, a method of selective catalytic reduction of $NO_x$ with ammonia ($NH_3$) is presently known as a superior process in connection with removing $NO_x$ from effluent gases of large boilers of power plants, heating or sintering furnaces in iron manufacture of heat-cracking furnaces of refineries and petrochemical factories.

Hereinafter, such plants and automobiles are referred to as fixed and movable sources of $NO_x$, respectively.

Developmental research on catalysts with excellent activity, life and regeneration properties has continued with respect to this method. Nevertheless, no satisfactory catalyst has been developed by these efforts. Recently, several interesting patents disclosing methods of selectively reducing $NO_x$ with $NH_3$ in the absence of a catalyst have been published.

In the oxidation-absorption methods, $NO_x$ is oxidized firstly to $NO_2$ with an inorganic reagent, for example, chlorite in the liquid phase or with an oxygen or ozone ($O_3$) containing gas in the liquid or vapor phase, in the presence or absence of a catalyst, while $NO_x$ is photochemically oxidized with a molecular oxygen containing gas. The formed $NO_2$ is absorbed with an alkaline or acidic solution (aqueous nitric acid) to form salts or dilute nitric acid solutions, so that the extent of the application of this method is limited or narrow unless the resulting salts or dilute nitric acid solutions may be widely utilized. Alternatively, a number of methods of $NO_x$ removal have been found which utilize a metal complex salt or a metal chelate compound. These methods may be classified as a so-called wet-method as well as the oxidation-absorption method already mentioned. It is, in general, necessary in the wet-method to treat the accumulated solution without secondary pollution. If such a solution is not otherwise useful, the problem of treating the waste solution is very difficult and troublesome.

In the $NO_x$ adsorption method, active carbon and other adsorbents and the molecular sieve effect have been investigated, and yet such developmental research would take time.

Various catalysts have been reported, but no industrial scale $NO_x$ catalytic decomposition method is known.

In addition, various methods of physically decomposing $NO_x$ will be described as follows:

i. Method of irradiating a gas containing $NO_x$, $SO_2$, $N_2$, $O_2$ and so on with an electron beam;

One such method is described in Japanese Patent Application Laid-Open No. 93268/1974.

ii. Method of treating a $NO_x$-containing gas with high frequency;

One such method is described in Japanese Patent Application Laid-Open No. 42471/1972.

iii. Method of treating a $NO_x$-containing gas by electric discharge:

On such method is described in U.S. Application Ser. No. 151,396, filed June 9, 1971, corresponding to Japanese Patent Application Laid-Open No. 6974/1973, which shows a method of decomposing $NO_x$ characterized in that a dilute plasma of $NO_x$ is generated, and followed by contacting said plasma component with a large surface area solid supported heterogeneous catalyst, wherein no irreversible reaction may occur between said plasma and said solids. Further, Japanese Patent Application Laid-Open No. 96970/1974 shows apparatus for decomposing $NO_x$ in which $NO_x$ is passed in a discharge bed for decomposition, the bed having two opposite electrodes and being packed with articles, wherein discharge occurs between the electrodes or among those particles on electric supply. The $NO_x$ decomposing apparatus is characterized in that said discharge bed useful for decomposing $NO_x$ serves as a discharge bed for decomposing an oil by electric discharge and said oil generates a combustible gas such as hydrogen, etc. Alternatively, said apparatus is provided separately with a bed to supply a combustible gas to said discharge bed for decomposing $NO_x$ or generating a combustible gas, said gas being generated by decomposition of said oil by electric discharge.

In this method, it is intended that the $NO_x$ decomposition reaction and the catalytic oxidation occur simultaneously in the reaction vessel for enhancing the reaction effect. The particles may be, preferably, a metal having a catalytic action, such as Cu, Ni, Fe, etc. for the object reaction.

Japanese Patent Application Laid-Open No. 124871/1975 shows a method in which electric discharge is applied among packed metal lines, foils, rods and powders. Further, Japanese Patent Application Laid-Open No. 60494/1975 shows a method in which $NO_x$ reacts with atomic oxygen to form $NO_2$ when corona discharge occurs in an atmosphere kept at the state of elevated temperature.

Japanese Patent Application Laid-Open No. 50271/1975 shows an electron bombardment apparatus for $NO_x$ removal, involving electron bombardment which comprises bombarding $NO_x$ molecules in the gas to be treated by an electron beam of a discharge zone, which results in elevating the energy level of $NO_x$ (NO, $NO_2$, etc.) or which forms activated $NO_x$, decomposing the activated $NO_x$ in an adsorption zone, and removing formed ozone with any suitable catalyst for decomposing ozone, characterized in that aluminium with an oxide film thereon is applied to the inner electrode of said discharge zone.

Japanese Patent Application Laid-Open No. 45768/1975 shows a method of removing $NO_x$ which includes a discharge between metal vapor generating bodies which are composed of a metal such as iron or other metal and are stretched between electrodes.

iv. Method of $NO_x$ removal by plasma:

Japanese Patent Application Laid-Open No. 122879/1974 shows a method of treating $NO_x$ contained in a gas which comprises heating the gas to a temperature of about 8000° K by a plasma generating apparatus, generating plasma of $NO_x$, atomizing $NO_x$ to N and O, followed by further treatment for reacting said atomic oxygen with any atom except atomic nitrogen to form an oxygen compound.

v. Method of $NO_x$ removal by ultraviolet ray:

One method is described in Japanese Patent Application Laid-Open No. 62366/1974.

On the other hand, methods of removal of poisonous substances ($NO_x$, CO, HC, etc.) from exhaust gases from vehicles may be roughly divided as follows:

i. Controlling combustive conditions by improving the engine, for example, Rotary or C.V.C.C. engines.
ii. Oxidizing or decomposing the poisonous substances in the presence of a catalyst.
iii. Lowering the occurrence of the poisonous substances by employing fuel additives.

There are a number of catalysts useful for removing CO and HC; however, the need for a catalyst useful in removing $NO_x$ will be more increased in the near future. There are many problems to be solved in connection with such catalysts, such as activity and durability in particular, and mechanical strength, abrasive resistance, price and so forth. The main causes of the decrease of activity of such a catalyst are lead and high temperatures, so that the catalyst should be exchanged frequently. Recently, an opinion has been noted that secondary air pollution would occur, because the poisonous metal oxide catalyst is destroyed on travel and dust or fine powders thereof diffuse in or spread over the surrounding atmosphere.

As shown in the foregoing, various different methods have been disclosed with respect to removing $NO_x$ from fixed sources as well as from movable sources, however, no perfect or determinative method has been accomplished at the present time. Further, the removal of pollusive $NO_x$ on the order of p.p.m. is very expensive.

In brief, there are some important problems to be solved concerning those methods:

Catalytic decomposition method i. A catalyst should be accessible which has essentially ideal properties for industrial utility or usefulness, and many times, numerous investigators and much expense are required for researching, developing and industrial running of such a catalyst.

ii. No catalyst has been found which causes speedy decomposition of $NO_x$, with the result that columns are required which have a very large packed catalyst volume. It is therefore very expensive in light of construction and operating costs, and also the cost of power would not be cheap, because the effluent gas must be passed through the column by overcoming the resistance of the packed catalyst (i.e., the pressure drop is large). And also, the exchange of catalyst is necessary.

Selective catalytic reduction method i. The problem of item (i) of the catalytic decomposition method is common to this method.
ii. The problem of item (ii) of the catalytic decomposition method, in any event, should be considered somewhat.

Adsorption method

The same problems as above-mentioned are common to the adsorbents of this method.

Oxidation-Absorption method

The salts or solutions which result from such processes should be further treated before being marketed or circulated, but such treatment is difficult, otherwise the accumulated salts or solutions should be discarded without causing water pollution. These problems are common to other so-called wet methods, including the reduction method in liquid phase or methods of using metal chelates or complex compounds. On the other hand, in the above-mentioned methods, substances reacting, chelating or complex-forming with $NO_x$ are used. Some adsorbents and chelate compounds, as well as catalysts, are generally expensive. Some reactants are expensive, for example, $O_3$. Some are applied in an amount over the stoichiometric amount, such as ammonia or carbon, so that the cost of such substances fed might not be negligible.

In general, with reference to the above typical citations of discharge methods, it should be understood that $NO_x$ is decomposed in the plasma zone generated by high voltage discharge in the presence of catalysts, or in the presence of an adsorbent having adsorption-desorption activity, and that the reaction mechanism is very complicated.

SUMMARY OF THE INVENTION

It is an object of the present invention to provide a method for decomposing $NO_x$ which is contained in a gas.

It is another object of the present invention to provide a method for decomposing $NO_x$ which is contained in an effluent gas derived from the aforementioned fixed and movable sources.

It is yet another object of the present invention to provide a method for decomposing $NO_x$ which is contained in an effluent gas from a fixed source wherein the gas is first treated by a conventional desulfurizing step to remove $SO_2$ gas therefrom, followed by immediately treating the resulting effluent gas to remove $NO_x$ therefrom, after removing $O_2$ or $H_2O$ by conventional methods if necessary.

It is yet another object of the present invention to provide a method for treating an effluent gas from a fixed source by first removing $NO_x$ therefrom, after removing $O_2$ or $H_2O$ therefrom by a conventional method if necessary, and then treating the resulting gas by a conventional desulfurizing step to remove $SO_2$ therefrom.

It is yet another object of the present invention to provide a method for decomposing $NO_x$ which is contained in an exhaust gas of a movable source such as a vehicle and converting $NO_x$ to $N_2$ and atomic oxygen O or molecular oxygen $O_2$.

It is yet another object of the present invention to provide a method for decomposing $NO_x$ which is contained in an exhaust gas of a vehicle by which CO and hydrocarbons (HC) are first oxidized to $CO_2$, or $CO_2$ and $H_2O$, respectively, using a conventional device such as an afterburner and then decomposing the $NO_x$ into $N_2$ and O or $O_2$.

It is yet another object of the present invention to provide an improved method for removing $NO_x$, CO, and HC from an exhaust gas of a vehicle by a combination of conventional methods and devices with the method of this invention to thereby accomplish enhanced removal of $NO_x$, CO and HC.

Other objects and devices will become apparent from the ensuing description.

The present invention comprises a method of decomposing $NO_x$ which comprises exciting a gas containing at least $N_2$ and $NO_x$ by microwave irradiation. In another embodiment, the present invention comprises a method of decomposing $NO_x$ which comprises exciting a gas containing at least $N_2$, $NO_x$ and $O_2$ and/or $CO_2$ by microwave irradiation. Alternatively, the present invention relates to a method of decomposing $NO_x$ which comprises exciting nitrogen by microwave irradiation to form active nitrogen, followed by reacting said active nitrogen with a gas containing at least $N_2$ and $NO_x$, or $N_2$, $NO_x$ and $SO_2$, or $N_2$, $NO_x$ and $O_2$ and/or $CO_2$, resulting in decomposition of the $NO_x$.

Furthermore, the present invention relates to a method of decomposing $NO_x$ or a gas containing at least $NO_x$ by microwave irradiation. In this invention, milliwave or laser irradiation can also be used.

According to this invention, the decomposition of $NO_x$ with high efficiency or yield is caused by the active nitrogen N* and $N_2$* generated from the $N_2$ in the gas by microwave irradiation without imparting a high voltage at a temperature ranging from the temperature in the reaction tube, or at ambient temperature, to that of the order of several hundred degrees(° C) with no catalyst or adsorbent.

In the method of this invention, no catalyst, adsorbent, or chemical reactant is used. Consequently, the disadvantages or drawbacks of the conventional $NO_x$ removal methods may be solved in accordance with this invention.

DESCRIPTION OF THE PREFERRED EMBODIMENTS

Some fundamental research reports have been published in connection with generating N* or $N_2$* from $N_2$ by microwave irradiation and reaction of N* or $N_2$* with $NO_x$. See the following literature:
1. The Journal of Chemical Physics 31 674 1959 Wilkinson P. G. and Mulliken R. S.
2. The Journal of Chemical Physics 35 1138 1961 Herron J. T.
3. The Journal of Chemical Physics 36 1509 1962 Phillips L. F. and Schiff H. I.
4. The Journal of Chemical Physics 42 1785–1790 1965 F. A. Morse and F. Kanfman
5. Nature 189 56 1961 Clyne M. A. A. and Thrush B. A.
6. Proceeding of Royal Society, A. 261 259 1961 Clyne M. A. A. and Thrush B. A.

However, there is no teaching or suggestion of the present invention therein.

As summarized above, the invention broadly involves decomposing $NO_x$ (wherein "x" represents the integer 1) in a gas containing the same. Although the invention is applicable to many different gases containing $NO_x$, it is especially useful in decomposing $NO_x$ contained in effluent and exhaust gases from the aforementioned fixed (and like sources) and movable sources. Accordingly, for ease of description only, the invention will be described in connection with treating such gases.

A conventional apparatus may be employed as a source of the microwave irradiation in the present invention. The preferred conditions for the method of the invention are as follows:

Feed temperature: room temperature (i.e., about 20° C) to 45° C
Pressure: 1 to 14 mm Hg
Radiation frequency: 2450 MHz
Input power of microwave: 100 to 140 W Further, as those skilled in the art are aware, precautions should be taken to prevent dangerous and unnecessary exposure to electromagnetic radiation in the practice of the method of the invention (e.g., a ferrite net may be used to limit the effect of the radiation to the $NO_x$—containing gas).

Although the invention is not intended to be limited thereby, it is believed that the method of the invention involves the following reactions:

Main Reactions

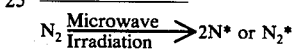

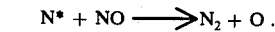

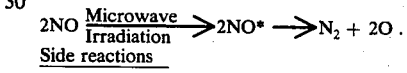

Side reactions

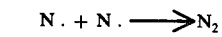

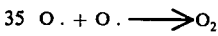

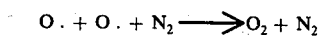

Referring to the prior art discharge or plasma methods of decomposing $NO_x$, the following may be noted.

i. The reaction mechanism is very complicated due to the fact that because of dissociation and ionization, there could simultaneously exist undissociated $NO_x$, electrons, ionic $NO_x$, atomic nitrogen, ionic nitrogen, nitrogen radical, molecular nitrogen, ionic oxygen, oxygen radical, atomic oxygen, and molecular oxygen, etc., and there would be appreciable interaction among those species. Therefore, the main reaction is not evident, particularly in the presence of a catalyst or adsorbent. The exclusion of such interaction is necessary.

Methods are known for excluding atomic oxygen, for example, reacting or bonding atomic oxygen with an atom other than nitrogen, or the co-existence of any substance capable of forming a combustible atom such as hydrogen and so on in the plasma zone. Alternatively, oxygen may be removed by an adsorbent or catalyst from the reaction zone.

ii. The plasma method is carried out generally at an elevated temperature.

iii. Ions and electrons exist absolutely in the plasma zone.

iv. There is a plasma reaction at a lower temperature wherein the ratio of ions and electrons to atoms and molecules is very small, but interactions among various species as mentioned in item (i) could not be neglected.

In comparison to the above conventional methods, the method of the present invention has the following features and advantages:

i. The main reactants are N* or $N_2$* and $NO_x$, while the resulting products are $N_2$ and O or $O_2$.

ii. The temperature of reaction may range broadly from ambient temperature to the order of several hundred degrees (° C).

iii. It is confirmed by emission spectra that there are substantially no electrons and ions formed, but rather there exists predominantly N* or $N_2$* in the case of irradiating an effluent gas containing $N_2$ and $NO_x$ by microwave power.

Also, there are conventional methods of thermal decomposition of $NO_x$ by a high frequency heating and catalytic decomposition of $NO_x$ under irradiation of ultraviolet ray, but those are different from the method of the present invention, because said conventional methods do not use active nigrogen N* or $N_2$*.

It should be understood that many other modifications can be made without departing from the spirit or scope of the present invention. The following examples are a further explanation of the present invention and are not intended to restrict or limit the same.

EXAMPLE 1 a. A gas mixture of $N_2$ and NO (formed by the mixture of $N_2$ gas (99.99% $N_2$) and NO gas (0.955% NO, balance $N_2$) was fed into an inlet of a reaction tube at ambient temperature and then passed downwardly through the tube where the stream of said gas mixture was irradiated by a microwave of 2450MHz 100W. The irradiated gas is introduced immediately into a Mass Spectrometer, without passing through a cold trap.

b. A gas mixture of $N_2$ and NO (formed as in (a) above) was fed firstly into a reaction tube from an upstream inlet at ambient temperature and then passed downwardly through the tube where the stream of said gas mixture was irradiated by a microwave of 2450MHz 100W. At a further downstream point, a gas mixture of $N_2$ and $SO_2$ (formed by the mixture of $N_2$ gas (99.99% $N_2$) and $SO_2$ gas (1.120% $SO_2$, balance $N_2$)) was fed into said reaction tube from a downstream inlet. The resulting gas was introduced immediately into a Mass Spectrometer, without passing through a cold trap.

The results are shown in Table 1 below, where "A" and "B" indicate the absence and presence of microwave irradiation, respectively. The pressure is 10 mm Hg and the blank spaces in Table 1 indicate no observation. The mass Spectrometer data are shown by the relative strength of the peaks.

TABLE 1

|  | M/e MASS NO. | (a) $N_2$+NO $2000\frac{ml}{min.}$ | | (a) $N_2$+NO $3000\frac{ml}{min.}$ | | (b) $N_2$+NO $3000\frac{ml}{min.}$ $N_2$+$SO_2$ $1500\frac{ml}{min.}$ | | (b) $N_2$+NO $3000\frac{ml}{min.}$ $N_2$+$SO_2$ $3000\frac{ml}{min.}$ | |
|---|---|---|---|---|---|---|---|---|---|
|  |  | A | B | A | B | A | B | A | B |
|  | 13 | 0.2 | 0.1 | 0.2 | 0.2 | 0.2 | 0.2 | 0.1 | 0.1 |
|  | 14 | 55.5 | 54.5 | 69.0 | 65.0 | 57.0 | 52.0 | 53.0 | 56.0 |
|  | 15 | 0.5 | 0.5 | 0.7 | 0.5 | 0.7 | 0.5 | 0.5 | 0.4 |
|  | 16 | 0.6 | 0.7 | 0.7 | 0.8 | 0.5 | 0.8 | 0.4 | 0.7 |
|  | 17 | 1.4 | 1.0 | 2.7 | 2.4 | 2.2 | 2.1 | 1.1 | 1.6 |
|  | 18 | 5.2 | 4.1 | 11.0 | 9.5 scale out* | 7.7 | 7.2 | 4.5 | 6.3 |
|  | 28 | 645 | 690 | (1050) | (870) | (720) | (650) | (630) | (570) |
|  | 29 | 6.6 | 6.2 | 7.6 | 6.8 | 7.2 | 6.4 | 6.1 | 6.0 |
| NO | 30 | 7.6 | 0.4 | 9.1 | 0.6 | 7.0 | 0.5 | 4.3 | 0.5 |
|  | 31 | 0.2 | 0.1 | 0.2 | 0.3 | 0.2 | 0.2 | 0.2 | 0.2 |
| $O_2$ | 32 | 0.9 | 3.0 | 0.4 | 2.7 | 0.4 | 2.7 | 0.4 | 2.0 |
|  | 39 | 0.1 | 0.1 | 0.2 | 0.1 | 0.1 | 0.1 | 0.05 | 0.05 |
|  | 41 | 0.1 | 0.1 | 0.3 | 0.2 | 0.1 | 0.1 | 0.05 | 0.05 |
|  | 43 | 0.1 | 0.1 | 0.3 | 0.2 | 0.1 | 0.1 | 0.05 | 0.05 |
|  | 44 | 0.4 | 0.4 | 0.6 | 0.7 | 0.7 | 0.6 | 0.2 | 0.6 |
|  | 48 |  |  |  |  | 0.05 | 0.9 | 0.6 | 0.5 |
|  | 50 |  |  |  |  |  | 0.05 |  |  |
|  | 56 |  |  | 0.2 | 0.1 | 0.05 | 0.05 |  |  |
|  | 58 |  |  | 0.2 | 0.1 | 0.05 | 0.05 |  |  |
|  | 64 |  |  |  |  | 0.05 | 0.05 | 0.4 | 0.3 |

*Scale out means to be the values which was estimated from recorded out chart paper, because of higher sensibility of recording device used.

In Table 1, the effect of NO removal is shown by (A-B)/A. The data indicates that NO is decomposed to $N_2$ and $O_2$ at high yields and that the presence of $SO_2$ lowers the NO decomposition rate. It is therefore preferable to remove $SO_2$ from the effluent gas prior to treatment in accordance with the present invention, although sufficiently high NO decomposition rates are obtained even in the presence of $SO_2$. Therefore, $SO_2$ may be removed after NO decomposition if desired. Any conventional method can be employed to remove $SO_2$ from the gas and those skilled in the art are aware of suitable techniques.

EXAMPLE 2

An $N_2$ stream is fed at ambient temperature into a reaction tube and irradiated by a microwave of 2450MHz 100W to from active nitrogen. Downstream of said $N_2$ stream containing active nitrogen, a gas at ambient temperature containing NO, $SO_2$ or $CO_2$ was introduced into said reaction tube. The resulting gas mixture was introduced immediately into a Mass Spectrometer, without passing through a cold trap. The Mass Spectrometer Data are shown as follows in Tabye 2:

TABLE 2

| $N_2$ | NO | $SO_2$ | $CO_2$ | Mass Ampere | | % Decomposition of NO | Detector |
|---|---|---|---|---|---|---|---|
|  |  |  |  | NO (A) | NO (B) |  |  |
| $1042\frac{ml}{min.}$ (83.2%) | $211.1\frac{ml}{min.}$ (16.8%) |  |  | $54.0 \times 10^{-8}$ | $2.75 \times 10^{-8}$ | 99.5 | Mass |

TABLE 2-continued

| N$_2$ | NO | SO$_2$ | CO$_2$ | Mass Ampere NO (A) | Mass Ampere NO (B) | % Decomposition of NO | Detector |
|---|---|---|---|---|---|---|---|
| 1000 $\frac{ml}{min.}$ (84.6%) | 131.4 $\frac{ml}{min.}$ (11.1%) | 49.9 $\frac{ml}{min.}$ (4.2%) | | $0.11 \times 10^{-7}$ | $0.03 \times 10^{-7}$ | 72.7 | " |
| 750 $\frac{ml}{min.}$ (70.1%) | 125 $\frac{ml}{min.}$ (11.7%) | | 195 $\frac{ml}{min.}$ (18.2%) | $5.3 \times 10^{-6}$ | $< 10^{-8}$ | 100 | " |

Note:
Pressure: 4 – 5 mmHg.
Temperature: ambient
A and B have same meaning as in Table 1

EXAMPLE 3

A 100% NO stream fed at ambient temperature into a reaction tube was passed downwardly through the tube where said stream was irradiated by a microwave of 2450 MHz 100W and the resulting gas was investigated by the Electron Spin Resonance Method. The value of ESR was 376.5 at the beginning (i.e., no irradiation) and decreased to 34.83 upon irradiation, which corresponds to 91% NO decomposition.

EXAMPLE 4

A gas mixture of N$_2$ and NO containing 0.992% NO was fed into a reaction tube from an inlet thereof at ambient temperature and then said gas passed downwardly through the tube where the stream of said gas mixture was irradiated by a microwave of 2450MHz 100W. The resulting gas was introduced immediately into a Mass Spectrometer, without passing through a cold trap. The influence of pressure and temperature on the rate of decomposition of NO is shown in Tables 3 and 4, respectively (where A and B have the same meaning as in Example 1):

TABLE 3

| Pressure (mmHg) | Flow rate of gas mixture (ml/min) | Mass Ampere of NO A | Mass Ampere of NO B | Decomposition rate of NO (%) |
|---|---|---|---|---|
| 24.1 | 3170 | $2.45 \times 10^{-10}$ | $2.14 \times 10^{-10}$ | 12.7 |
| 14.3 | 1880 | $185 \times 10^{-10}$ | $0.128 \times 10^{-10}$ | 93.1 |
| 7.8 | 1030 | $1.10 \times 10^{-10}$ | $0.12 \times 10^{-10}$ | 89.1 |
| 3.4 | 450 | $0.407 \times 10^{-10}$ | $0.12 \times 10^{-10}$ | 70.6 |

TABLE 4

| Feed Temperature (° C) | Pressure (mmHg) | Flow rate of gas Mixture (ml/min) | Mass Ampere of NO A | Mass Ampere of NO B | Decomposition rate of NO % |
|---|---|---|---|---|---|
| 28,45 | 13.7 | 1800 | $1.71 \times 10^{-10}$ | — | 0 |
| 28 | " | " | " | $0.09 \times 10^{-10}$ | 94.7 |
| 30 | " | " | " | $0.137 \times 10^{-10}$ | 92.0 |
| 40 | " | " | " | $0.098 \times 10^{-10}$ | 94.3 |
| 45 | " | " | " | $0.076 \times 10^{-10}$ | 95.6 |

EXAMPLES 5–17

Nitrogen, nitrogen oxide NO and oxygen and/or carbon-dioxide were fed into a reaction tube from an inlet thereof at ambient temperature and then said gases passed downwardly through the tube where the stream of said gas mixture was irradiated by a microwave of 2450MHz 130–140W. The Mass Ampere of NO before microwave radiation at 28° and 45° was observed to be $1.71 \times 10^{-10}$. The reacted gas is introduced immediately into a Mass Spectrometer, without passing through a cold trap. The results are shown in Table 5, where A and B have the same meaning as in Example 1:

TABLE 5

| Example No. | N$_2$ | NO | SO$_2$ | O$_2$ | CO$_2$ | Mass Ampere of NO A | Mass Ampere of NO B | Decomposition rate of NO (%) |
|---|---|---|---|---|---|---|---|---|
| 5 | 810 | 7.2 (0.88%) | — | 0 | — | $4.5 \times 10^{-9}$ | | 0 |
| 6 | 810 | 7.2 (0.88%) | — | 9.8 (0.6%) | — | $4.5 \times 10^{-9}$ | $0.0 \times 10^{-9}$ | 100 |
| 7 | 800 | 7.2 (0.88%) | — | 11.0 (1.4%) | — | $4.0 \times 10^{-9}$ | $0.2 \times 10^{-9}$ | 95 |
| 8 | 800 | 7.2 (0.88%) | — | 13.5 (1.7%) | — | $3.33 \times 10^{-9}$ | $0.5 \times 10^{-9}$ | 85 |
| 9 | 800 | 7.2 (0.88%) | — | 14.5 (1.8%) | — | $3.25 \times 10^{-9}$ | $0.65 \times 10^{-9}$ | 80 |
| 10 | 790 | 7.2 (0.88%) | — | 16.0 (2.0%) | — | $3.13 \times 10^{-9}$ | $0.75 \times 10^{-9}$ | 76 |
| 11 | 790 | 7.2 (0.88%) | — | 17.0 (2.2%) | — | $3.00 \times 10^{-9}$ | $0.75 \times 10^{-9}$ | 75 |
| 12 | 760 | 7.1 (0.86%) | — | 13.5 (1.8%) | 27.2 (3.3%) | $2.88 \times 10^{-9}$ | $0.95 \times 10^{-9}$ | 67 |
| 13 | 790 | 7.1 (0.86%) | — | 12.5 (1.6%) | 10.7 (1.3%) | $2.27 \times 10^{-9}$ | $0.50 \times 10^{-9}$ | 78 |
| 14 | 800 | 7.1 (0.86%) | — | 12.0 (1.5%) | 5.9 (0.7%) | $2.22 \times 10^{-9}$ | $0.40 \times 10^{-9}$ | 82 |
| 15 | 810 | 7.1 (0.86%) | — | 10.5 (1.3%) | 0 | $2.50 \times 10^{-9}$ | $0.05 \times 10^{-9}$ | 98 |

TABLE 5-continued

| Example No. | N$_2$ | Flow rate of gases (ml/min) | | | | Mass Ampere of NO | | Decomposition rate of NO (%) |
| --- | --- | --- | --- | --- | --- | --- | --- | --- |
| | | NO | SO$_2$ | O$_2$ | CO$_2$ | A | B | |
| 16 | 820 | 7.1 (0.86%) | — | 0 | 0 | 2.25×10$^{-9}$ | 0.0 ×10$^{-9}$ | 100 |
| 17 | 820 | 7.1 | — | 0 | 0 | 2.25×10$^{-9}$ | | 0 |

Note:
Pressure 7mm Hg
Feed Temperature: ambient
Decomposition rate of NO is corrected value.
In this calculation, the values of A are corrected basing on the value of N$_2$ measured.

Decomposition rate % is $\frac{A - B}{A} \times 100$

The data in Table 5 indicate that the decomposition rate of NO gradually decreases as the oxygen content of the gas mixture increases. In addition, the data shows that the NO decomposition rate gradually increases as the sum of the oxygen and carbon dioxide contents decreases. The data in Example 2 indicates that the presence of carbon dioxide by itself (i.e., without oxygen) does not affect the decomposition rate of NO. In short, the data in Tables 2 and 5 indicate that the present invention can tolerate the presence of carbon dioxide alone or small amounts of oxygen alone or small amounts of oxygen and carbon dioxide together.

The foregoing examples illustrate that NO$_x$ can be effectively removed in one operation at yields of more than 90% in a single operation according to the present invention.

What is claimed is:

1. A method for removing NO$_x$ from an effluent gaseous mixture comprising NO$_x$ and N$_2$ which comprises irradiating said gaseous mixture with microwave radiation at a gas pressure from about 1 to 14 mm Hg whereby the NO$_x$ in said gaseous mixture is decomposed to nitrogen and oxygen.

2. The method of claim 1 wherein said gaseous mixture is an effluent gas and the irradiation is carried out prior to discharging said effluent gas into the atmosphere.

3. The method of claim 2 wherein said effluent gas is the exhaust gas of a vehicle.

4. The method of claim 1, wherein said gaseous mixture is subjected to a desulfurization step prior to said microwave irradiation to remove SO$_2$ from said gaseous mixture.

5. The method of claim 1, wherein O$_2$ and H$_2$O are removed from said gaseous mixture prior to said microwave irradiation.

6. The method of claim 1, wherein said gaseous mixture is irradiated while contained in a reaction tube.

7. The method of claim 1 wherein said irradiating is conducted at a temperature from about 20° to 45° C.

8. The method of claim 1 wherein said microwave radiation has input power from 100 to 140 W.

9. The method of claim 1 wherein said microwave radiation is at 2450 MHz.

10. The method for removing NO$_x$ from a gas which comprises irradiating a stream of nitrogen gas with microwave radiation, thereby forming active nitrogen, and contacting said gas containing said NO$_2$ with said irradiated nitrogen containing active nitrogen whereby the NO$_x$ is decomposed to nitrogen and oxygen.

11. The method of claim 10, wherein said gas containing NO$_x$ is subjected to a desulfurization step prior to introducing to said stream of active nitrogen.

12. The method of claim 10, wherein O$_2$ and H$_2$O are removed from said gas containing NO$_x$ prior to introducing to said stream of active nitrogen.

* * * * *

UNITED STATES PATENT AND TRADEMARK OFFICE
CERTIFICATE OF CORRECTION

PATENT NO. : 4,076,606
DATED : February 28, 1978
INVENTOR(S) : SUZUKI ET AL

It is certified that error appears in the above-identified patent and that said Letters Patent are hereby corrected as shown below:

Column 2, line 18, change "On" to --One--

Column 8, line 25, in Table 1, "scale out" should appear in between Headings A and B, second occurrence Column 8, line 56, change "to from" to --to form--

Column 8, line 62, change "Tabye" to --Table--

Column 10, line 21, in Table 3 under the Heading A, change "185x10$^{-10}$" to --1.85x10$^{-10}$--

Signed and Sealed this

Twelfth Day of September 1978

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,076,606

DATED : February 28, 1978

INVENTOR(S) : SUZUKI ET AL.

It is certified that error appears in the above-identified patent and that said Letters Patent are hereby corrected as shown below:

Title Page, Box [30], below Foreign Application Priority Data, insert --January 29, 1975

Japan 50-12068--

Signed and Sealed this

*Seventeenth* Day of *October 1978*

[SEAL]

*Attest:*

RUTH C. MASON
*Attesting Officer*

DONALD W. BANNER
*Commissioner of Patents and Trademarks*